United States Patent
Wisniewski

(10) Patent No.: US 11,775,885 B2
(45) Date of Patent: *Oct. 3, 2023

(54) INTERACTION BETWEEN A NETWORK IDENTITY SERVICE AND ACCOUNT-BASED SERVICE APPLICATIONS

(71) Applicant: Alclear, LLC, New York, NY (US)

(72) Inventor: Rob Wisniewski, New York, NY (US)

(73) Assignee: ALCLEAR, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/115,666

(22) Filed: Feb. 28, 2023

(65) Prior Publication Data
US 2023/0214733 A1   Jul. 6, 2023

Related U.S. Application Data

(63) Continuation of application No. 16/587,355, filed on Sep. 30, 2019, now Pat. No. 11,615,350.

(Continued)

(51) Int. Cl.
*G06Q 10/02* (2012.01)
*G06Q 20/10* (2012.01)
(Continued)

(52) U.S. Cl.
CPC ........... *G06Q 10/025* (2013.01); *G06F 21/32* (2013.01); *G06Q 10/02* (2013.01); *G06Q 20/102* (2013.01);
(Continued)

(58) Field of Classification Search
CPC .... G06Q 10/025; G06Q 10/02; G06Q 20/102; G06Q 50/30; G06Q 20/40145; G06F 21/32; H04L 9/3231
(Continued)

(56) References Cited

U.S. PATENT DOCUMENTS 5,991,429 A   11/1999   Coffin et al.
6,119,096 A   9/2000   Mann et al.
(Continued)

FOREIGN PATENT DOCUMENTS

GB   2400344 A   * 10/2004   ....... G06K 19/07716

OTHER PUBLICATIONS

Barra et al. "Biometrics-as-a-service: Cloud-based technology, systems, and applications" (IEEE Cloud Computing Jul./Aug. 2018) (Year: 2018).*

(Continued)

*Primary Examiner* — Jeff Zimmerman
*Assistant Examiner* — Brian A Tallman
(74) *Attorney, Agent, or Firm* — Brownstein Hyatt Farber Schreck, LLP

(57) ABSTRACT

A hardware system enables computer network interaction between network identity services and account-based service applications. In some examples, the network identity service biometrically identifies people. The network identity services and/or account-based service applications interact to exchange data in order to monitor, track, initiate, and/or cooperatively and/or individually perform various functions while protecting data that should not be shared and minimizing communication network usage and hardware and software resources. This interaction enables both to accomplish more and different tasks than they could individually while improving operational efficiency of hardware and software components of both.

20 Claims, 6 Drawing Sheets

Related U.S. Application Data

(60) Provisional application No. 62/773,014, filed on Nov. 29, 2018.

(51) Int. Cl.
  *G06F 21/32* (2013.01)
  *G06Q 50/30* (2012.01)
  *G06Q 20/40* (2012.01)
  *H04L 9/32* (2006.01)

(52) U.S. Cl.
  CPC ....... *G06Q 50/30* (2013.01); *G06Q 20/40145* (2013.01); *H04L 9/3231* (2013.01)

(58) Field of Classification Search
  USPC .......................................................... 705/6
  See application file for complete search history.

(56) References Cited

U.S. PATENT DOCUMENTS

| | | | |
|---|---|---|---|
| 8,381,969 B1 | 2/2013 | Miller et al. | |
| 8,423,462 B1 | 4/2013 | Amacker et al. | |
| 8,521,131 B1 | 8/2013 | Ramalingam et al. | |
| 8,571,902 B1* | 10/2013 | Glavan ................. | G06Q 50/10 705/325 |
| 8,744,966 B1 | 6/2014 | Amacker et al. | |
| 8,965,170 B1 | 2/2015 | Benea | |
| 9,107,064 B1 | 8/2015 | Ramalingam et al. | |
| 9,166,961 B1 | 10/2015 | Johansson et al. | |
| 9,202,105 B1 | 12/2015 | Wang et al. | |
| 9,324,098 B1 | 4/2016 | Agrawal et al. | |
| 9,386,507 B1 | 7/2016 | Ramalingam et al. | |
| 9,607,138 B1 | 3/2017 | Baldwin et al. | |
| 9,609,577 B1 | 3/2017 | Ramalingam et al. | |
| 9,681,350 B1 | 6/2017 | Marupaduga et al. | |
| 9,681,359 B2 | 6/2017 | Ramalingam et al. | |
| 9,723,131 B1 | 8/2017 | Ramalingam et al. | |
| 9,836,642 B1 | 12/2017 | Ramaswamy | |
| 9,934,504 B2 | 4/2018 | Wang et al. | |
| 9,967,250 B2 | 5/2018 | Johansson et al. | |
| 10,027,662 B1 | 7/2018 | Mutagi et al. | |
| 10,055,740 B2 | 8/2018 | Hanson et al. | |
| 10,104,181 B1 | 10/2018 | Rao et al. | |
| 10,108,791 B1 | 10/2018 | Masterman | |
| 10,108,961 B2 | 10/2018 | Wang et al. | |
| 10,122,727 B2 | 11/2018 | Johansson et al. | |
| 10,147,325 B1 | 12/2018 | Copeland et al. | |
| 10,235,669 B2 | 3/2019 | Amacker et al. | |
| 10,242,364 B2 | 3/2019 | Wang et al. | |
| 10,243,945 B1 | 3/2019 | Kruse et al. | |
| 11,151,481 B1 | 10/2021 | Sun et al. | |
| 2004/0221303 A1 | 11/2004 | Sie | |
| 2012/0078638 A1 | 3/2012 | Novack et al. | |
| 2013/0073859 A1* | 3/2013 | Carlson ................. | H04L 9/3247 713/176 |
| 2013/0227664 A1* | 8/2013 | McKay ................. | H04L 9/3231 726/7 |
| 2014/0189720 A1 | 7/2014 | Terrazas | |
| 2015/0294515 A1 | 10/2015 | Bergdale | |
| 2015/0371157 A1* | 12/2015 | Jaffe .................... | G06Q 10/025 705/6 |
| 2016/0189063 A1 | 6/2016 | Nie | |
| 2017/0032485 A1* | 2/2017 | Vemury .............. | G06F 16/9535 |
| 2017/0188103 A1 | 6/2017 | Pan | |
| 2017/0310770 A1 | 10/2017 | Samaan et al. | |
| 2018/0007060 A1 | 1/2018 | Leblang et al. | |
| 2018/0219863 A1 | 8/2018 | Tran et al. | |
| 2019/0036939 A1 | 1/2019 | Johansson et al. | |
| 2019/0043001 A1* | 2/2019 | Woulfe .............. | G01C 21/3438 |
| 2019/0050631 A1 | 2/2019 | Hayase | |

OTHER PUBLICATIONS

A. Alotaibi and A. Mahmmod, "Enhancing OAuth services security by an authentication service with face recognition," 2015 Long Island Systems, Applications and Technology, 2015, pp. 1-6, doi: 10.1109/LISAT.2015.7160208. (Year: 2015).*

Alotaibi et al., "Enhancing OAuth services security by an authentication service with face recognition," Long Island Systems, Applications and technology, pp. 1-6, 2015.

Author Unknown, "OAuth entry," Wikipedia, http://web.archive.org/web/20171119023619/https://en.wikipedia.org/wiki/OAuth>, Nov. 19, 2017.

Barra et al., "Biometrics-as-a-service: Cloud-based technology, systems, and applications," IEEE Cloud Computing 5.4, pp. 33-37, 2018.

* cited by examiner

INTERACTION BETWEEN A NETWORK IDENTITY SERVICE AND ACCOUNT-BASED SERVICE APPLICATIONS

CROSS-REFERENCE TO RELATED APPLICATION(S)

This application is a continuation patent application of U.S. patent application Ser. No. 16/587,355, filed Sep. 30, 2019 and titled "Interaction Between a Network Identity Service and Account-Based Service Applications," which is a nonprovisional patent application of and claims the benefit of U.S. Provisional Patent Application No. 62/773,014, filed Nov. 29, 2018 and titled "Interaction Between a Network identity Service and Account-Based Service Applications," the disclosures of which are hereby incorporated herein by reference in their entireties.

FIELD

The described embodiments relate generally to computer network interactions between network applications. More particularly, the present embodiments relate to computer network interaction between network identity services and account-based service applications.

BACKGROUND

A network identity service may be a service that controls access to stored identity information over a network to perform and/or facilitate various functions. Network identity services may compare received identification information to stored identification information to locate and/or allow access to stored identity information. For example, this kind of network identity service may be used to authenticate and/or verify the identity of a person, such as for controlling access to routine and/or expedited airport or other security screening, boarding control, and so on.

Account-based service applications allow people to create accounts that may be used to request goods and/or services. Such account-based service applications may be accessed via a mobile app, web browser, or other application. For example, this kind of account-based service application may be used to order ridesharing services, food or other delivery services, and so on using personal information stored for the account.

SUMMARY

The present disclosure relates to computer network interaction between network identity services and account-based service applications. The network identity services and/or account-based service applications interact to exchange data in order to monitor, track, initiate, and/or cooperatively and/or individually perform various functions while protecting data that should not be shared and minimizing communication network usage and hardware and software resources. This interaction enables both to accomplish more and different tasks than they could individually while improving operational efficiency of hardware and software components of both.

In some embodiments, a system for computer network interaction between a network identity service and an account-based service application includes at least one non-transitory storage medium that stores instructions and at least one processor. The at least one processor executes the instructions to identify a person for flight screening, determine the person is a rideshare service application account holder, and transmit a message to facilitate a rideshare service for the person upon arrival.

In various examples, the system further includes a biometric reader device and the at least one processor identifies the person by receiving a digital representation of a biometric and comparing the digital representation of the biometric to stored biometric data. In some implementations of such examples, the digital representation of the biometric is at least one of a facial image, an iris image, or a retina image.

In some examples, the at least one processor transmits the message to an electronic device associated with the person. In various implementations of such examples, the message allows the person to request the rideshare service. In some implementations of such examples, the message launches a rideshare service interface application on the electronic device.

In various examples, the at least one processor transmits the message to an electronic device associated with a rideshare service application. In some implementations of such examples, the message initiates the rideshare service for the person.

In some examples, the at least one processor determines the person is the rideshare service application account holder by accessing identity information stored for the person. In various examples, the at least one processor processes a payment for the rideshare service. In some implementations of such examples, the at least one processor processes the payment using identity information stored for the person.

In various embodiments, a system for computer network interaction between a network identity service and an account-based service application includes at least one non-transitory storage medium that stores instructions and at least one processor. The at least one processor executes the instructions to receive a rideshare service application request to an airport for a person, determine the person is an identity service member, and provide direction to an identity service facility upon arrival.

In various embodiments, a system for computer network interaction between a network identity service and an account-based service application includes at least one non-transitory storage medium that stores instructions and at least one processor. The at least one processor executes the instructions to identify a person for flight screening, determine the person is not a rideshare service application account holder, enroll the person in a rideshare service application, and transmit a message to facilitate a rideshare service for the person upon arrival.

In various embodiments, a system for computer network interaction between a network identity service and an account-based service application includes at least one non-transitory storage medium that stores instructions and at least one processor. The at least one processor executes the instructions to receive a rideshare service application request to an airport for a person, determine the person is not an identity service member, enroll the person in an identity service, and provide direction to an identity service facility upon arrival.

In various embodiments, a system for computer network interaction between a network identity service and an account-based service application includes at least one non-transitory storage medium that stores instructions and at least one processor. The at least one processor executes the instructions to receive a rideshare service application request to an airport for a person, determine the person is an identity service member, arrange for the person to be taken to an identity service facility upon arrival, identify the person at screening, determine the person boards a flight, transmit a first message to facilitate a rideshare service for the person on arrival, and transmit a second message to facilitate food delivery service for the person to correspond to rideshare completion.

In some embodiments, a system for computer network interaction between a network identity service and an account-based service application includes at least one non-transitory storage medium that stores instructions and at least one processor. The at least one processor executes the instructions to identify a person for flight screening using the network identity service, determine the person is a rideshare service application account holder, and transmit a message to facilitate a rideshare service for the person upon arrival.

In a number of examples, the system further includes a biometric reader device wherein the at least one processor identifies the person by receiving a digital representation of a biometric and comparing the digital representation of the biometric to stored biometric data. In some implementations of such examples, the digital representation of the biometric includes at least one of a facial image, an iris image, or a retina image.

In various examples, the at least one processor transmits the message to an electronic device associated with the person. In a number of implementations of such examples, the message allows the person to request the rideshare service. In other implementations of such examples, the message launches a rideshare service interface application on the electronic device.

In some examples, the at least one processor transmits the message to an electronic device associated with a rideshare service application. In various implementations of such examples, the message initiates the rideshare service for the person.

In a number of examples, the at least one processor determines the person is the rideshare service application account holder by accessing identity information stored for the person. In various examples, the at least one processor processes a payment for the rideshare service. In some implementations of such examples, the at least one processor processes the payment using identity information stored for the person.

In various examples the person is a first person and the at least one processor identifies a second person for the flight screening using the using the network identity service, determines the second person is not enrolled in the rideshare service application, and enrolls the person in the rideshare service application. In a number of implementations of such examples, the at least one processor facilitates the rideshare service for the second person upon arrival.

In some examples, the at least one processor determines whether the person boarded a flight before transmitting the message. In a number of examples, the message is a first message and the at least one processor transmits a second message to facilitate food delivery service for the person to correspond to rideshare completion.

In various embodiments, a system for computer network interaction between a network identity service and an account-based service application includes at least one non-transitory storage medium that stores instructions and at least one processor. The at least one processor executes the instructions to receive a rideshare service application request to an airport for a person, determine the person is an identity service member, and provide direction to an identity service facility upon arrival.

In some examples, the person is a first person, the rideshare service application request is a first service application request, and the at least one processor receives a second rideshare service application request for a second person, determines the second person is not enrolled in the network identity service, and enrolls the second person in the network identity service. In various examples the at least one processor uses information stored for the second person in a rideshare service application associated with the second rideshare service application request to enroll the second person in the network identity service.

In a number of embodiments, a system for computer network interaction between a network identity service and an account-based service application includes at least one non-transitory storage medium that stores instructions and at least one processor. The at least one processor executes the instructions to identify a person for security screening using the network identity service, determine the person is a service application account holder, and transmit a message to facilitate a service for the person.

In various examples, the network identity service biometrically identifies the person.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The description that follows includes sample systems, methods, and computer program products that embody various elements of the present disclosure. However, it should be understood that the described disclosure may be practiced in a variety of forms in addition to those described herein.

Network identity services and account-based service applications can perform a wide variety of functions. However, the functions they perform are typically different and separate. In implementations where they may be configured to perform similar functions, excess resources are consumed in designing such functions, configuring such functions, and supporting such functions. Enabling interactions between network identity services and account-based service applications extends the functions that network identity services and account-based service applications and/or the electronic devices used to implement them can perform. Enabling such interactions also reduces redundant components and/or configuration, system complexity, and hardware and software resource consumption.

The present embodiments relate to computer network interaction between network identity services and account-based service applications. The network identity services and/or account-based service applications interact to exchange data in order to monitor, track, initiate, and/or cooperatively and/or individually perform various functions while protecting data that should not be shared and minimizing communication network usage and hardware and software resources. This interaction enables both to accomplish more and different tasks than they could individually while improving operational efficiency of hardware and software components of both.

These and other embodiments are discussed below with reference to FIGS. 1-6. However, those skilled in the art will readily appreciate that the detailed description given herein with respect to these Figures is for explanatory purposes only and should not be construed as limiting.

Figure 1:
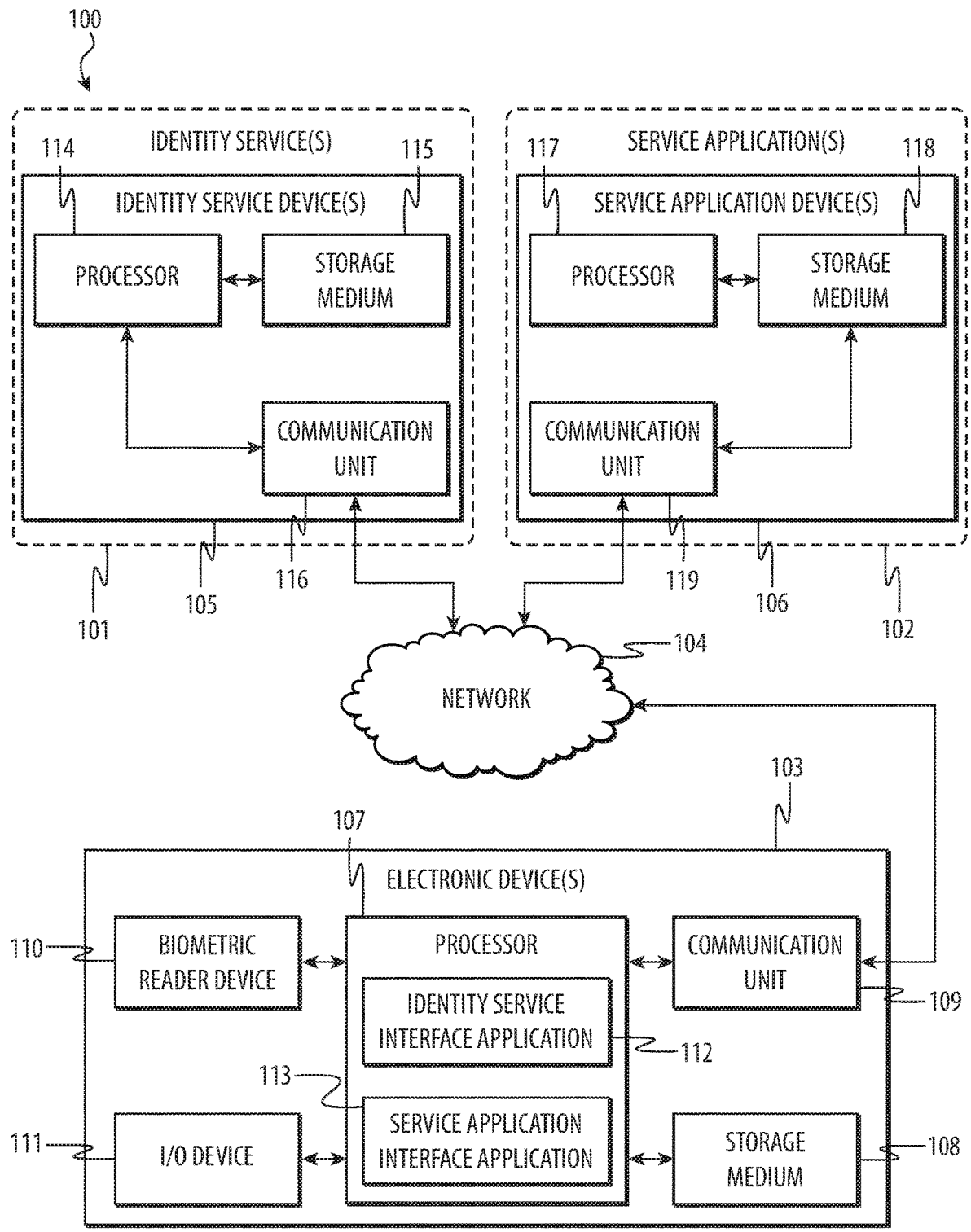
FIG. 1 depicts an example system for computer network interaction between network identity services and account-based service applications.

FIG. 1 depicts an example system for computer network interaction between network identity services and account-based service applications. The system 100 may include one or more identity services 101, one or more service applications 102, and/or one or more electronic devices 103 that may be operative to communicate with each other via one or more communication networks 104.

The electronic device 103 may be any kind of electronic device, such as a computing device, a laptop computing device, a desktop computing device, a vehicle, a tablet computing device, a mobile computing device, a wearable computing device, a mobile telephone, a smart phone, and so on. The identity services 101 and the service applications 102 may be implemented using one or more identity service devices 105 and one or more service application devices 106, which may likewise be one or more of any kind of electronic devices arranged in any kind of individual and/or cloud or other cooperative computing arrangement.

The identity service 101 may be a service that controls access to stored identity information (such as name, social security number, phone number, address, financial account numbers or statuses, credit card and/or other payment information, boarding pass information, and so on) over the network 104 to perform and/or facilitate various functions. In various implementations, the identity service 101 may compare received identification information (such as one or more hashes and/or other digital representations of biometrics like one or more digital representations of one or more facial images, retina images, iris images, fingerprints, voice prints, gaits, and so on) to stored identification information (such as stored biometric data) to locate and/or allow access to stored identity information. By way of illustration, a digital representation of a biometric may be encoded into a data structure, transmitted over the network 104, and provided to a matching engine for that type of biometric by a processor 114 where the matching engine compares the digital representation of the biometric extracted from the data structure to stored biometric data in a non-transitory storage medium 115. For example, the identity service 101 may be used to authenticate and/or verify the identity of a person, such as for controlling access to routine and/or expedited airport or other security screening, boarding control, and so on.

The service applications 102 may allow people to create accounts that may be used to request goods and/or services. The service applications 102 may be accessed via a mobile app, web browser, or other application. The account may store personal information such as name, address, telephone number, credit card or other payment information, and so on. The mobile app, web browser, or other application may be used to request goods and/or services for the account using the personal information stored for the account. For example, the service applications 102 may be used to order ridesharing services, food or other delivery services, and so on.

The electronic device 103 may include one or more processors 107, non-transitory storage media 108 (which may take the form of, but is not limited to, a magnetic storage medium; optical storage medium; magneto-optical storage medium; read only memory; random access memory; erasable programmable memory; flash memory; and so on), communication units 109, biometric reader devices 110 (such as one or more cameras, microphones, fingerprint readers, phosphorescent fingerprint scanners, 3D sensor, and/or any other device operable to obtain digital representations of one or more biometrics), input/output components 111 (such as one or more touch screens, displays, buttons, keyboards, computer mice, touch panels, switches, microphones, and so on), and so on. The processor 107 may execute instructions stored in the storage medium 108 to perform various functions, such as to implement one or more identity service interface applications 112 and/or service application interface applications 113 (which may be mobile apps, web browsers, or other applications) to communicate with the identity service 101 and/or the service application 102 over the network 104 via the communication unit 109.

Likewise, the identity service device 105 may include one or more processors 114, non-transitory storage media 115, communication units 116, and so on. The processor 114 may execute instructions stored in the storage media 115 to perform various functions, such as to communicate with the identity service interface application 112 and/or the service application 102 via the network 104 using the communication unit 116.

Similarly, the service application device 106 may include one or more processors 117, non-transitory storage media 118, communication units 119, and so on. The processor 117 may execute instructions stored in the storage media 118 to perform various functions, such as to communicate with the service application interface application 113 and/or the identity service device 105 via the network 104 using the communication unit 119.

Figure 2:
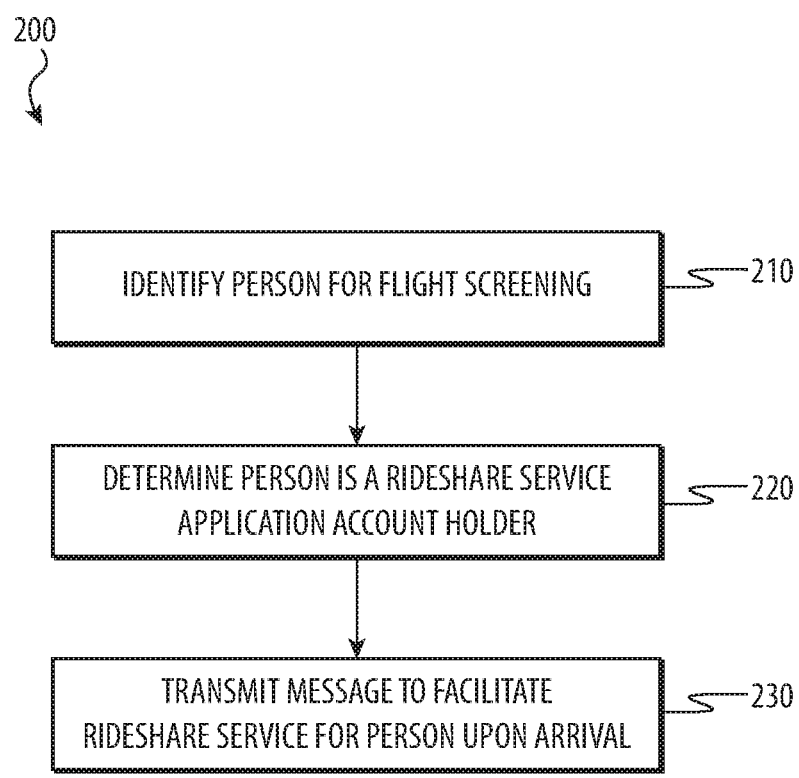
FIG. 2 depicts a flow chart illustrating a first example method for computer network interaction between network identity services and account-based service applications. This method may be performed by the system of FIG. 1.

FIG. 2 depicts a flow chart illustrating a first example method 200 for computer network interaction between network identity services and account-based service applications. This method 200 may be performed by the system 100 of FIG. 1.

At operation 210, an electronic device identifies a person for flight screening. For example, a digital representation of a biometric may be obtained using a biometric reader (such as a facial image, a retina image, an iris image, and so on that may be obtained using a camera or other imaging or sensing device) and compared to stored biometric data associated with identity information for the person. The identity information may authenticate and/or verify the identity of the person, whether or not the person has a valid flight at a respective airport, and so on.

At operation 220, the electronic device may determine whether or not the person is a rideshare service application account holder. For example, an identity service may store data regarding rideshare service application accounts for the person in stored identity information. Rideshare service application accounts may similarly store information associated with the account regarding identity service with which a person may be enrolled. Such information may be recorded in the respective systems based on interaction between rideshare service applications and identity service apps or applications executing on an electronic device controlled by a person, by the person using OAUTH (Open Authorization) or similar techniques to limitedly log in to the identity service from the rideshare service application account and/or from the rideshare service application account to the identity service to link accounts, by exchange of information between the rideshare service application account and the identity service, and so on.

At operation 230, the electronic device transmits a message to facilitate rideshare service for the person upon arrival. For example, the electronic device may transmit a message to the person's phone after arrival that rideshare services are available and/or where to meet such a rideshare service. Such a message may launch a rideshare service application interface application that the person may use to request the rideshare service. By way of another example, the electronic device may transmit a message to the rideshare service application to schedule the rideshare service, such as using boarding pass and/or other information stored in relation to identity information. In some implementations, the electronic device may also transmit a message to an electronic device associated with the person regarding the rideshare service that has been scheduled. In various implementations, an application for the identity service executing on the person's mobile phone may include a button that can be clicked to request a rideshare.

Although the example method 200 is illustrated and described as including particular operations performed in a particular order, it is understood that this is an example. In various implementations, various orders of the same, similar, and/or different operations may be performed without departing from the scope of the present disclosure.

For example, the method 200 is illustrated and described as determining whether or not the person is a rideshare service application account member. However, in various implementations, all identity service members may be given accounts with the rideshare service application. In such an implementation, operation 220 may be omitted. Various configurations are possible and contemplated without departing from the scope of the present disclosure.

In other examples, a rideshare service stand outside the airport may be equipped with a camera for capturing facial images. The person may walk up to have his picture taken and an electronic device may use the facial image to identify the person and request a rideshare for the person using identity information stored for the person and/or rideshare service application account information. This may enable particularly frictionless experiences for the person.

In still other examples, the electronic device may access airline ticket information and/or other information related to identity information to determine that the person's flight includes other people who are associated with the person. Such other people may be related travelers, family, friends, business associates, and so on. Such other people may use the same rideshare as the person. As such, when transmitting the message, the electronic device may include details regarding these other people and/or otherwise take these other people into account so that the rideshare may be able to accommodate everyone and/or all destinations if the people are not all going to the same place.

In various examples, this example method 200 may be implemented as a group of interrelated software modules or components that perform various functions discussed herein. These software modules or components may be executed by one or more computing devices, such as the identity service device 105, the service application device 106, and/or the electronic device 103 of FIG. 1.

Figure 3:
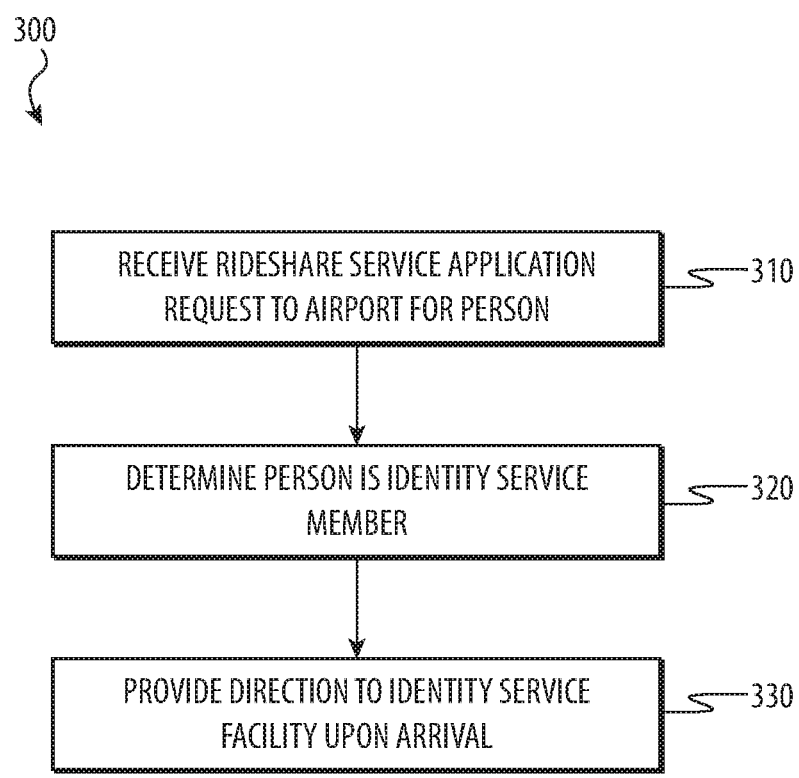
FIG. 3 depicts a flow chart illustrating a second example method for computer network interaction between network identity services and account-based service applications. This method may be performed by the system of FIG. 1.

FIG. 3 depicts a flow chart illustrating a second example method 300 for computer network interaction between network identity services and account-based service applications. This method 300 may be performed by the system 100 of FIG. 1.

At operation 310 an electronic device may receive a rideshare service application request to an airport for a person. At operation 320, the electronic device may determine that the person is an identity service member.

For example, the electronic device my look up information associated with the person's rideshare service application account to determine that the person is an identity service member when the person requests the rideshare or when the person enters the rideshare. In other examples, a digital representation of a biometric for the person (such as a facial image, an iris image, a retina image, and so on) may be obtained by an electronic device (such as one associated with the person, the rideshare, and so on) when the person enters the rideshare and such a digital representation of a biometric may be transmitted to the identity service to determine whether or not the person is a member.

At operation 330, the electronic device may provide a direction to an identity service facility upon arrival. For example, the electronic device may transmit such directions to the person's mobile telephone, transmit such directions to an electronic device controlled by the driver who is instructed to provide the directions to the person, and so on. The identity service facility may be a routine and/or expedited security screening or boarding, a lounge or other area accessible to identity service members, and so on.

Although the example method 300 is illustrated and described as including particular operations performed in a particular order, it is understood that this is an example. In various implementations, various orders of the same, similar, and/or different operations may be performed without departing from the scope of the present disclosure.

For example, the method 300 is illustrated and described as providing a direction to an identity service facility upon arrival. However, it is understood that this is an example. In some implementations, the direction may be provided prior to arrival. In various implementations, the directions may include a map. In some implementations, a driver may be instructed to drop the person at a particular location rather than providing a direction. In various implementations, one or more messages may be transmitted to the identity service, the airport, airport security, an airline, or other entity regarding the person's arrival for purposes of flow control, security, preparation of rewards or other entitlements for the person to be presented upon arrival at the identity service facility, and so on. Various configurations are possible and contemplated without departing from the scope of the present disclosure.

In various examples, this example method 300 may be implemented as a group of interrelated software modules or components that perform various functions discussed herein. These software modules or components may be executed by one or more computing devices, such as the identity service device 105, the service application device 106, and/or the electronic device 103 of FIG. 1.

Figure 4:
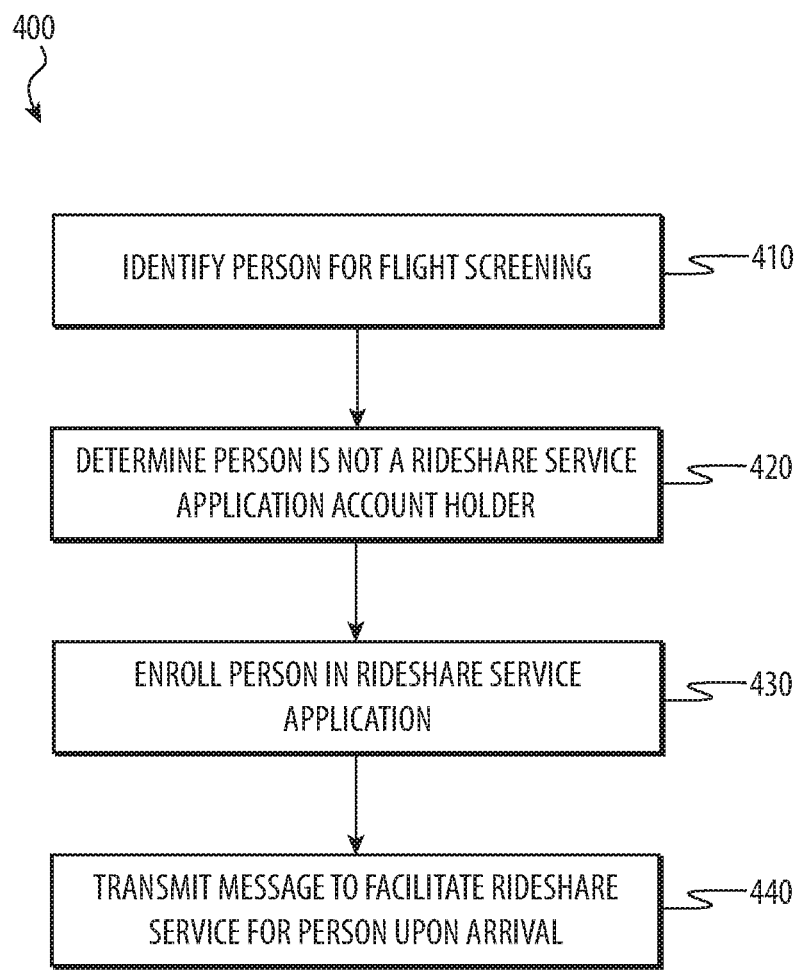
FIG. 4 depicts a flow chart illustrating a third example method for computer network interaction between network identity services and account-based service applications. This method may be performed by the system of FIG. 1.

FIG. 4 depicts a flow chart illustrating a third example method 400 for computer network interaction between network identity services and account-based service applications. This method 400 may be performed by the system 100 of FIG. 1.

At operation 410, an electronic device identifies a person for a flight screening. At operation 420, the electronic device determines that the person is not a rideshare service application account holder. At operation 430, the electronic device enrolls the person in a rideshare service application.

For example, the electronic device may automatically use identity information stored for the person to set up an account for the person with the rideshare service application. This may involve transmitting one or more messages and/or downloading one or more mobile apps or applications to an electronic device controlled by the person that enable use of the account. In many implementations, the person may be prompted to accept such an account enrollment prior to any action being taken.

In some implementations, at operation 440, the electronic device may also transmit a message to facilitate a rideshare service for the person upon arrival. In some examples, this may be part of the enrollment. In other examples, the person may be presented with an option to schedule the rideshare after enrollment. Various configurations are possible and contemplated without departing from the scope of the present disclosure.

By way of another example, the electronic device may transmit a message to the person's mobile phone or other device offering to enroll the person in the rideshare service application. The electronic device may offer one or more discounts or other incentives for accepting the enrollment.

In still other examples, the electronic device may provide a message to the person regarding the rideshare service application without assisting in enrollment. The person may then use other means to enroll if the person desires to do so. Various configurations are possible and contemplated without departing from the scope of the present disclosure.

Although the example method 400 is illustrated and described as including particular operations performed in a particular order, it is understood that this is an example. In various implementations, various orders of the same, similar, and/or different operations may be performed without departing from the scope of the present disclosure.

For example, the method 400 is illustrated and described as transmitting a message to facilitate the rideshare. However, in other examples, the electronic device may enroll the person and allow the person to determine whether or not to request a rideshare himself. In such examples, operation 440 may be omitted. Various configurations are possible and contemplated without departing from the scope of the present disclosure.

In various examples, this example method 400 may be implemented as a group of interrelated software modules or components that perform various functions discussed herein. These software modules or components may be executed by one or more computing devices, such as the identity service device 105, the service application device 106, and/or the electronic device 103 of FIG. 1.

Figure 5:
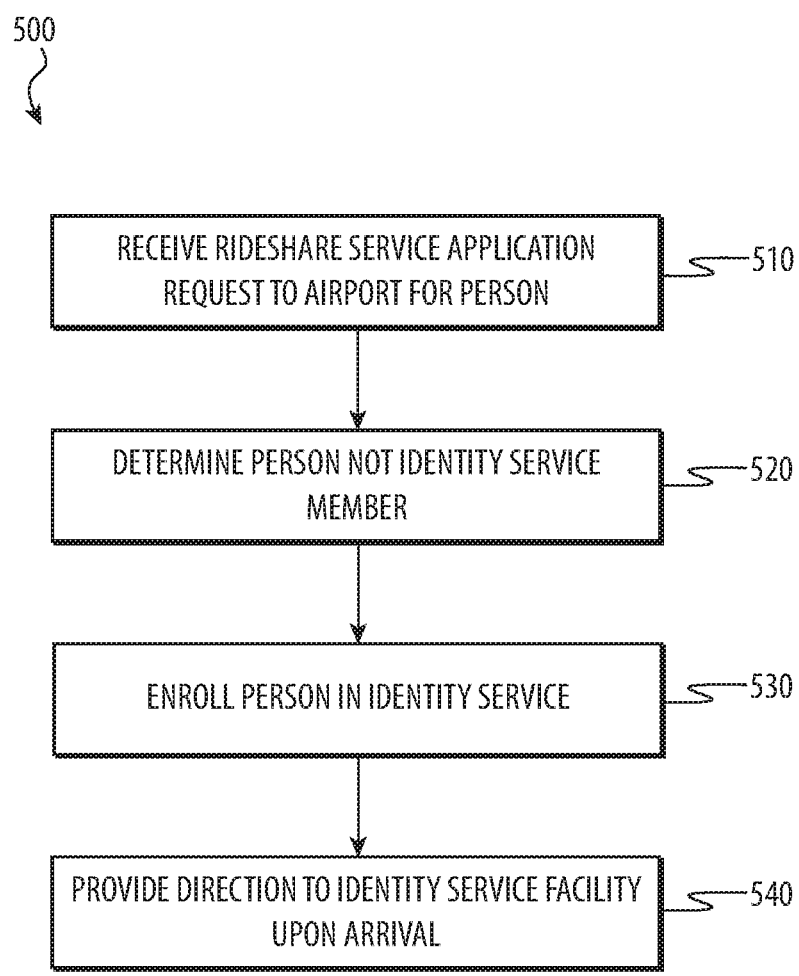
FIG. 5 depicts a flow chart illustrating a fourth example method for computer network interaction between network identity services and account-based service applications. This method may be performed by the system of FIG. 1.

FIG. 5 depicts a flow chart illustrating a fourth example method 500 for computer network interaction between network identity services and account-based service applications. This method 500 may be performed by the system 100 of FIG. 1.

At operation 510, an electronic device may receive a rideshare service application request to an airport for a person. At operation 520, the electronic device may determine that the person is not an identity service member. At operation 530, the electronic device may enroll or initiate enrollment for the person in the identity service.

For example, in some implementations, the electronic device may direct the person to be delivered to and/or directed to an enrollment location at the airport upon arrival. The person may then enroll upon arrival.

In other implementations, an option to enroll may be transmitted to and/or presented on an electronic device (such as an identity service button presented in a mobile app for the rideshare service application), such as the person's mobile telephone, an electronic device in the rideshare, and so on. The person may submit information for enrollment, and/or account information stored by the rideshare service application may be transmitted to the identity service as part of the enrollment. This may have some inherent trustworthiness as the identity service can at least be certain that the person submitting the information had access to the person's rideshare service application account. Digital representations of biometrics and/or other information (such as a picture of an identification like a driver's license or passport) may be captured during the rideshare and/or obtained at an identity service facility upon arrival.

For example, a person may be able to complete part of the enrollment during the rideshare and provide one or more digital representations of biometrics at an identity service device upon arrival. By way of illustration, the person may provide a picture of his driver's license while enrolling during the rideshare and then provide a facial image upon arrival, which may be matched to the image of the driver's license for authentication purposes. In some implementations, such partial enrollment may allow operations that do not involve human oversight to be completed during the rideshare while allowing operations that do involve human oversight to be completed upon reaching an identity service facility where such human oversight may be available. In some implementations, the driver of the rideshare may be authorized to provide such human oversight during the rideshare. In various implementations, a system involving partial enrollments may use tiered confidence levels where a partial enrollment is associated with a lower confidence level for enrollment than a complete enrollment but may still be usable in some identity service functions. In other examples, the person may confirm a rideshare service application account credential to the identity service device for authentication purposes.

In some examples, payment information associated with the person's rideshare service application account may be used to pay for the identity service enrollment. In some implementations of such examples, the rideshare service application may process the payment for the enrollment. In other implementations of such examples, the rideshare service application may provide the payment information to the identity service, such as upon authorization to do so by the person. Various configurations are possible and contemplated without departing from the scope of the present disclosure.

At operation 540, the electronic device may provide direction to the identity service facility upon arrival. Such a facility may be a routine and/or expedited screening or boarding, a lounge or other facility, an enrollment center or device (such as a kiosk), and so on.

Although the example method 500 is illustrated and described as including particular operations performed in a particular order, it is understood that this is an example. In various implementations, various orders of the same, similar, and/or different operations may be performed without departing from the scope of the present disclosure.

For example, the method 500 is illustrated and described as providing direction to the identity service facility upon arrival. However, it is understood that this is an example and operation 540 may be omitted in some implementations. Various configurations are possible and contemplated without departing from the scope of the present disclosure.

In various examples, this example method 500 may be implemented as a group of interrelated software modules or components that perform various functions discussed herein. These software modules or components may be executed by one or more computing devices, such as the identity service device 105, the service application device 106, and/or the electronic device 103 of FIG. 1.

Figure 6:
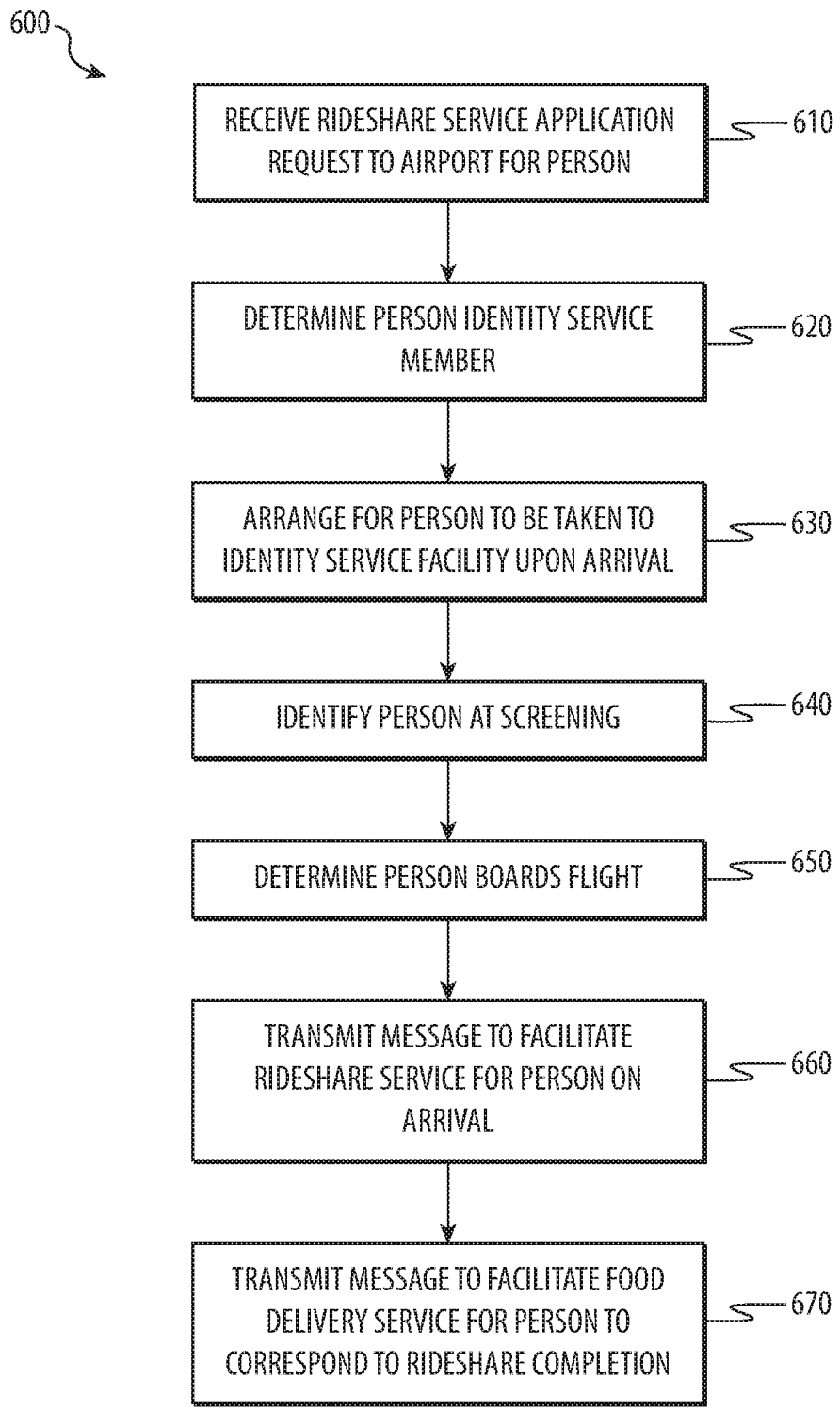
FIG. 6 depicts a flow chart illustrating a fifth example method for computer network interaction between network identity services and account-based service applications. This method may be performed by the system of FIG. 1.

FIG. 6 depicts a flow chart illustrating a fifth example method 600 for computer network interaction between network identity services and account-based service applications. This method 600 may be performed by the system 100 of FIG. 1.

At operation 610, a system may receive a rideshare service application request to an airport for a person. At operation 620, the system may determine that the person is an identity service member. At operation 630, the system may arrange for a person to be taken to an identity service facility upon arrival. Such a facility may be a routine and/or expedited screening or boarding, a lounge or other facility, and so on.

At operation 640, the system may identify the person at a screening. At operation 650, the system may determine that the person boards a flight. At operation 660, the electronic device may transmit a message to facilitate a rideshare service for the person upon arrival.

Additionally, at operation 670, the system may transmit a message to facilitate food delivery service for the person to correspond to rideshare completion. In some examples, the rideshare service application may also be a food delivery service application and the same service application may be used to provide both functions. In other examples, the two service applications may be separate. In various implementations, the same vehicle may be used for the rideshare and the food delivery. In other implementations, different vehicles may be used. In some implementations, these options and/or other options discussed herein may be determined based on input from the person, defaults and/or other preferences previously specified by the person, and so on.

Thus, the method 600 may encompass a number of actions facilitating the person's journey from start to finish, including meal planning upon eventual termination of the journey. Such may not be possible without interaction between the rideshare service application and the identity service.

Although the example method 600 is illustrated and described as including particular operations performed in a particular order, it is understood that this is an example. In various implementations, various orders of the same, similar, and/or different operations may be performed without departing from the scope of the present disclosure.

For example, the method 600 is illustrated and described as transmitting a message to facilitate food delivery. However, it is understood that this is an example. In various implementations, operation 670 may be omitted. Various configurations are possible and contemplated without departing from the scope of the present disclosure.

In various examples, this example method 600 may be implemented as a group of interrelated software modules or components that perform various functions discussed herein. These software modules or components may be executed by one or more computing devices, such as the identity service device 105, the service application device 106, and/or the electronic device 103 of FIG. 1.

Although particular embodiments have been illustrated and described above, it is understood that these are examples. In various implementations, other computer network interaction between a network identity service and an account-based service application may be performed without departing from the scope of the present disclosure.

For example, a rideshare service application may use an identity service to verify that a person getting into a rideshare is the person for whom the rideshare is summoned. Alternatively, the rideshare service application may use the identity service to determine whether or not the person is trustworthy for a rideshare, whether or not a driver is trustworthy for a rideshare, to process payment for a rideshare, to verify that a person is authorized to use payment information to pay for a rideshare and/or other transaction in implementations where the rideshare service application may be used to pay for other transactions, and so on. Various configurations are possible and contemplated without departing from the scope of the present disclosure.

By way of another example, rideshare service applications and airlines or other entities may implement loyalty, rewards, or related accounts for people. In various implementations, an identity service may be operable to interact with these various entities in order to link such loyalty, rewards, or related accounts. For example, both flights and rideshares purchased from partnered rideshare service applications and airlines may be linked by an identity service to discount future rideshares or flights and/or other free or otherwise discounted products or services.

In some implementations, a system for computer network interaction between a network identity service and an account-based service application may include at least one non-transitory storage medium that stores instructions and at least one processor. The at least one processor may execute the instructions to identify a person for flight screening, determine the person is a rideshare service application account holder, and transmit a message to facilitate a rideshare service for the person upon arrival.

In various examples, the system may further include a biometric reader device and the at least one processor may identify the person by receiving a digital representation of a biometric and comparing the digital representation of the biometric to stored biometric data. In some such examples, the digital representation of the biometric may be at least one of a facial image, an iris image, or a retina image.

In some examples, the at least one processor may transmit the message to an electronic device associated with the person. In various such examples, the message may allow the person to request the rideshare service. In some such examples, the message may launch a rideshare service interface application on the electronic device.

In various examples, the at least one processor may transmit the message to an electronic device associated with a rideshare service application. In some such examples, the message may initiate the rideshare service for the person.

In some examples, the at least one processor may determine the person is the rideshare service application account holder by accessing identity information stored for the person. In various examples, the at least one processor may process a payment for the rideshare service. In some implementations of such examples, the at least one processor may process the payment using identity information stored for the person.

In various embodiments, a system for computer network interaction between a network identity service and an account-based service application may include at least one non-transitory storage medium that stores instructions and at least one processor. The at least one processor may execute the instructions to receive a rideshare service application request to an airport for a person, determine the person is an identity service member, and provide direction to an identity service facility upon arrival.

In various embodiments, a system for computer network interaction between a network identity service and an account-based service application may include at least one non-transitory storage medium that stores instructions and at least one processor. The at least one processor may execute the instructions to identify a person for flight screening, determine the person is not a rideshare service application account holder, enroll the person in a rideshare service application, and transmit a message to facilitate a rideshare service for the person upon arrival.

In various embodiments, a system for computer network interaction between a network identity service and an account-based service application may include at least one non-transitory storage medium that stores instructions and at least one processor. The at least one processor may execute the instructions to receive a rideshare service application request to an airport for a person, determine the person is not an identity service member, enroll the person in an identity service, and provide direction to an identity service facility upon arrival.

In various embodiments, a system for computer network interaction between a network identity service and an account-based service application may include at least one non-transitory storage medium that stores instructions and at least one processor. The at least one processor may execute the instructions to receive a rideshare service application request to an airport for a person, determine the person is an identity service member, arrange for the person to be taken to an identity service facility upon arrival, identify the person at screening, determine the person boards a flight, transmit a first message to facilitate a rideshare service for the person on arrival, and transmit a second message to facilitate food delivery service for the person to correspond to rideshare completion.

In some embodiments, a system for computer network interaction between a network identity service and an account-based service application may include at least one non-transitory storage medium that stores instructions and at least one processor. The at least one processor may execute the instructions to identify a person for flight screening using the network identity service, determine the person is a rideshare service application account holder, and transmit a message to facilitate a rideshare service for the person upon arrival.

In a number of examples, the system further may include a biometric reader device wherein the at least one processor identifies the person by receiving a digital representation of a biometric and comparing the digital representation of the biometric to stored biometric data. In some such examples, the digital representation of the biometric may include at least one of a facial image, an iris image, or a retina image.

In various examples, the at least one processor may transmit the message to an electronic device associated with the person. In a number of such examples, the message may allow the person to request the rideshare service. In other such examples, the message may launch a rideshare service interface application on the electronic device.

In some examples, the at least one processor may transmit the message to an electronic device associated with a rideshare service application. In various such examples, the message may initiate the rideshare service for the person.

In a number of examples, the at least one processor may determine the person is the rideshare service application account holder by accessing identity information stored for the person. In various examples, the at least one processor may process a payment for the rideshare service. In some such examples, the at least one processor may process the payment using identity information stored for the person.

In various examples the person is a first person and the at least one processor may identify a second person for the flight screening using the using the network identity service, determine the second person is not enrolled in the rideshare service application, and enroll the person in the rideshare service application. In a number of such examples, the at least one processor may facilitate the rideshare service for the second person upon arrival.

In some examples, the at least one processor may determine whether the person boarded a flight before transmitting the message. In a number of examples, the message may be a first message and the at least one processor may transmit a second message to facilitate food delivery service for the person to correspond to rideshare completion.

In various embodiments, a system for computer network interaction between a network identity service and an account-based service application may include at least one non-transitory storage medium that stores instructions and at least one processor. The at least one processor may execute the instructions to receive a rideshare service application request to an airport for a person, determine the person is an identity service member, and provide direction to an identity service facility upon arrival.

In some examples, the person may be a first person, the rideshare service application request may be a first service application request, and the at least one processor may receive a second rideshare service application request for a second person, determine the second person is not enrolled in the network identity service, and enroll the second person in the network identity service. In various examples the at least one processor may use information stored for the second person in a rideshare service application associated with the second rideshare service application request to enroll the second person in the network identity service.

In a number of embodiments, a system for computer network interaction between a network identity service and an account-based service application may include at least one non-transitory storage medium that stores instructions and at least one processor. The at least one processor may execute the instructions to identify a person for security screening using the network identity service, determine the person is a service application account holder, and transmit a message to facilitate a service for the person.

In various examples, the network identity service may biometrically identify the person.

As described above and illustrated in the accompanying figures, the present disclosure relates to computer network interaction between network identity services and account-based service applications. The network identity services and/or account-based service applications interact to exchange data in order to monitor, track, initiate, and/or cooperatively and/or individually perform various functions while protecting data that should not be shared and minimizing communication network usage and hardware and software resources. This interaction enables both to accomplish more and different tasks than they could individually while improving operational efficiency of hardware and software components of both.

Although the above illustrates and describes a number of embodiments, it is understood that these are examples. In various implementations, various techniques of individual embodiments may be combined without departing from the scope of the present disclosure.

The present disclosure recognizes that biometric and/or other personal data is owned by the person from whom such biometric and/or other personal data is derived. This data can be used to the benefit of those people. For example, biometric data may be used to conveniently and reliably identify and/or authenticate the identity of people, access securely stored financial and/or other information associated with the biometric data, and so on. This may allow people to avoid repeatedly providing physical identification and/or other information.

The present disclosure further recognizes that the entities that collect, analyze, store, and/or otherwise use such biometric and/or other personal data should comply with well-established privacy policies and/or privacy practices. Particularly, such entities should implement and consistently use privacy policies and practices that are generally recognized as meeting or exceeding industry or governmental requirements for maintaining security and privately maintaining biometric and/or other personal data, including the use of encryption and security methods that meets or exceeds industry or government standards. For example, biometric and/or other personal data should be collected for legitimate and reasonable uses and not shared or sold outside of those legitimate uses. Further, such collection should occur only after receiving the informed consent. Additionally, such entities should take any needed steps for safeguarding and securing access to such biometric and/or other personal data and ensuring that others with access to the biometric and/or other personal data adhere to the same privacy policies and practices. Further, such entities should certify their adherence to widely accepted privacy policies and practices by subjecting themselves to appropriate third party evaluation.

Additionally, the present disclosure recognizes that people may block the use of, storage of, and/or access to biometric and/or other personal data. Entities who typically collect, analyze, store, and/or otherwise use such biometric and/or other personal data should implement and consistently prevent any collection, analysis, storage, and/or other use of any biometric and/or other personal data blocked by the person from whom such biometric and/or other personal data is derived.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A method for enrolling a person on an account-based rideshare service, the method comprising:
   receiving, at a server, identification information of the person during screening before a flight;
   transmitting, by the server, the identification information of the person to a network identity service over a computer network, the network identity service storing identity information for multiple people;
   receiving, at the server, identity information for the person from the network identity service, based on the identification information;
   determining, by the server, that the person is not an account-holder associated with the account-based rideshare service, based on the identity information; and
   transmitting, by the server, a message to an electronic device of the person, the message including an offer to enroll the person with an account on an application for the account-based rideshare service using the identity information; wherein the application interacts with the network identity service as part of an open authorization interaction that performs a limited login between the network identity service and the application, the performance of the limited login directed by the person.

2. The method of claim 1, further comprising:
   facilitating a ride for the person upon arrival of the flight, using the account on the account-based rideshare service.

3. The method of claim 1, wherein the message further comprises:
   a prompt to accept the enrollment of the account; and
   in response to the person accepting the enrollment, presenting an option to request a ride upon arrival of the flight of the person.

4. The method of claim 1, wherein the receiving the identification information of the person during the screening further comprises:
   receiving a digital representation of a biometric of the person captured through a biometric reader;

transmitting the digital representation of the biometric to the network identity service; and receiving respective identity information for the person from the network identity service, as a result of comparing the digital representation of the biometric to biometric data for the multiple people in the network identity service, the biometric data for the multiple people corresponding to the identity information for the multiple people.

5. The method of claim 4, wherein the digital representation of the biometric comprises at least one of a facial image, an iris image, or a retina image.

6. The method of claim 1, further comprising transmitting at least a portion of the identity information to the account-based rideshare service.

7. A method of enrolling a person on a network identity service, the method comprising:

receiving, at an application for an account-based rideshare service instantiated on an electronic device of the person, a request for a ride to an airport for the person;

retrieving identification information associated with the person;

transmitting the identification information of the person to a network identity service over a computer network, the network identity service storing identity information for multiple people;

receiving, from the network identity service, a determination, based on the identification information, that the identification information associated with the person cannot be matched to identity information for any one of the multiple people stored in the network identity service; and displaying, on the application instantiated on the electronic device of the person, an offer to enroll the person with a membership on the network identity service; wherein the application interacts with the network identity service as part of an open authorization interaction that performs a limited login between the network identity service and the application, the performance of the limited login directed by the person.

8. The method of claim 7, wherein at least a portion of the identification information is retrieved using information associated with the person from the application instantiated on the electronic device.

9. The method of claim 7, wherein the retrieving the identification information further comprises receiving, (i) verification of an identity document during the ride and (ii) a digital representation of a biometric of the person at an identity service station upon arrival.

10. The method of claim 9, wherein the determination that the identification information associated with the person cannot be matched to the identity information for any one of the multiple people stored in the network identity service further comprises a comparison of the digital representation of the biometric to biometric data for the multiple people stored in the network identity service.

11. The method of claim 9, wherein the digital representation of the biometric comprises at least one of a facial image, an iris image, or a retina image.

12. The method of claim 7, further comprising:

displaying, on the application instantiated on the electronic device of the person, directions towards an enrollment facility associated with the network identity service upon arrival at the airport; and receiving a digital representation of a biometric of the person obtained at the enrollment facility.

13. The method of claim 7, further comprising receiving payment information associated with the person from the application for the person to complete enrollment on the network identity service.

14. The method of claim 7, further comprising directing the person to an enrollment location.

15. A method comprising:

receiving, at an application for an account-based rideshare service instantiated on an electronic device of a person, a request for a ride to an airport for the person;

retrieving identification information associated with the person;

transmitting the identification information of the person to a network identity service over a computer network, the network identity service storing identity information for multiple people;

receiving, from the network identity service, a determination, based on the identification information, that the identification information associated with the person matches with identity information of at least one of the multiple people stored in the network identity service;

displaying, on the application instantiated on the electronic device of the person, directions to guide the person towards a station associated with the network identity service upon arrival at the airport;

receiving one or more notifications, from the electronic device of the person, that the person passed screening and boarded a flight from the airport; and facilitating a ride for the person upon arrival of the flight, via the application for the account-based rideshare service; wherein the application interacts with the network identity service as part of an open authorization interaction that performs a limited login between the network identity service and the application, the performance of the limited login directed by the person.

16. The method of claim 15, further comprising facilitating, via the application, a food delivery for the person upon completion of the ride.

17. The method of claim 16, wherein the ride and the food delivery are facilitated according to preferences of the person stored in the application for the account-based rideshare service.

18. The method of claim 15, wherein the determination that the identification information associated with the person matches with the identity information of the at least one of the multiple people stored in the network identity service further comprises a comparison of a digital representation of a biometric of the person to biometric data for the multiple people stored in the network identity service.

19. The method of claim 18, wherein the digital representation of the biometric comprises at least one of a facial image, an iris image, or a retina image.

20. The method of claim 15, wherein the flight comprises multiple flights.

* * * * *